US012758809B2

(12) United States Patent
Zhang et al.

(10) Patent No.: US 12,758,809 B2
(45) Date of Patent: Oct. 13, 2026

(54) AUTOMATIC FIRE EXTINGUISHING SYSTEM FOR ELECTRIC VEHICLE PARKING SPACE

(71) Applicant: YANTAI CHUNGWAY NEW ENERGY TECHNOLOGY CO., LTD., Yantai (CN)

(72) Inventors: Lilei Zhang, Yantai (CN); Yang Wang, Yantai (CN); Mingming Li, Yantai (CN); Xuebing Wang, Yantai (CN); Guangcai Ju, Yantai (CN); Hao Lin, Yantai (CN); Xiaotong Shi, Yantai (CN)

(73) Assignee: YANTAI CHUNGWAY NEW ENERGY TECHNOLOGY CO., LTD., Yantai (CN)

( * ) Notice: Subject to any disclaimer, the term of this patent is extended or adjusted under 35 U.S.C. 154(b) by 293 days.

(21) Appl. No.: 18/649,985

(22) Filed: Apr. 29, 2024

(65) Prior Publication Data

US 2024/0278052 A1 Aug. 22, 2024

Related U.S. Application Data

(63) Continuation of application No. PCT/CN2023/089246, filed on Apr. 19, 2023.

(30) Foreign Application Priority Data

Dec. 3, 2022 (CN) ........................ 202223229179.7

(51) Int. Cl.
*A62C 3/07* (2006.01)
*A62C 3/16* (2006.01)
(Continued)

(52) U.S. Cl.
CPC .................. *A62C 3/07* (2013.01); *A62C 3/16* (2013.01); *A62C 31/005* (2013.01); *A62C 37/04* (2013.01); *G08B 17/06* (2013.01); *G08B 25/10* (2013.01)

(58) Field of Classification Search
CPC .. A62C 3/07; A62C 3/16; A62C 37/44; A62C 31/005; A62C 37/04; G08B 17/06; G08B 25/10
(Continued)

(56) References Cited

U.S. PATENT DOCUMENTS 6,354,564 B1 * 3/2002 Van Scyoc .............. F16L 37/32 137/614.04
2001/0037885 A1 * 11/2001 Sundholm ............ A62C 3/0292 169/54
(Continued)

FOREIGN PATENT DOCUMENTS

CN 108237927 A 7/2018
CN 110064148 A * 7/2019 ............... A62C 3/16
(Continued)

OTHER PUBLICATIONS

Internation Search Report of PCT/CN2023/089246, Mailed Jul. 1, 2023.

*Primary Examiner* — Cody J Lieuwen

(57) ABSTRACT

The present application discloses an automatic fire extinguishing system for an electric vehicle parking space, including a thermal runaway isolation system, and further including a detection system, a medium system, and a fire control access system. The detection system is installed inside a battery pack of an electric vehicle and performs fire monitoring inside the battery pack. One end of the fire control access system extends into a vehicle body of the electric vehicle and is joined to the inside of the battery pack, and the other end of the fire control access system extends
(Continued)

out of the vehicle body of the electric vehicle and is communication with the medium system. The medium system is disposed outside an electric vehicle parking space. The fire control access system includes a transfer pipe and a quick insertion joint mechanism. Existing "afterward fire extinguishing" in the technical status in the background is resolved.

14 Claims, 2 Drawing Sheets

(51) Int. Cl.

| | |
|---|---|
| ***A62C 31/00*** | (2006.01) |
| ***A62C 37/36*** | (2006.01) |
| ***G08B 17/06*** | (2006.01) |
| ***G08B 25/10*** | (2006.01) |

(58) Field of Classification Search
USPC ................................................ 251/149–149.7
See application file for complete search history.

(56) References Cited

U.S. PATENT DOCUMENTS

| | | | | |
|---|---|---|---|---|
| 2023/0181950 | A1 * | 6/2023 | Bäder | A62C 3/16 169/47 |
| 2023/0280323 | A1 * | 9/2023 | Sandahl | F24F 7/02 73/31.05 |
| 2024/0157182 | A1 * | 5/2024 | Kang | A62C 3/07 |

FOREIGN PATENT DOCUMENTS

| | | | |
|---|---|---|---|
| CN | 113289283 | A | 8/2021 |
| CN | 215154069 | U | 12/2021 |
| CN | 216092001 | U | 3/2022 |
| CN | 216169473 | U | 4/2022 |
| CN | 114432616 | A | 5/2022 |
| CN | 114470563 | A | 5/2022 |
| CN | 115738151 | A | 3/2023 |
| CN | 219110725 | U | 6/2023 |
| EP | 4306178 | * | 1/2024 |
| JP | 2014036714 | A | 2/2014 |
| KR | 10-249248 | * | 2/2023 |

* cited by examiner

AUTOMATIC FIRE EXTINGUISHING SYSTEM FOR ELECTRIC VEHICLE PARKING SPACE

CROSS-REFERENCE TO RELATED APPLICATIONS

This application is a continuation of International Patent Application No. PCT/CN2023/089246 with a filing date of Apr. 19, 2023, designating the United States, now pending, and further claims priority to Chinese Patent Application No. 202223229179.7 with a filing date of Dec. 3, 2022. The content of the aforementioned applications, including any intervening amendments thereto, are incorporated herein by reference.

TECHNICAL FIELD

The present application relates to the technical field of electric vehicle fire extinguishing, and specifically to an automatic fire extinguishing system for an electric vehicle parking space.

BACKGROUND

With the quick development of the new energy vehicle industry, the public has increasingly high safety requirements for lithium ion batteries. Currently, as the sales of new energy vehicles grow, abnormalities of lithium ion batteries keep increasing, and spontaneous combustion of electric vehicles during use also increases year by year, causing growing public concern. By the year of 2021, the total number of new energy vehicles in China has reached 7,840, 000. A total of about 3000 fire accidents of new energy vehicles have occurred nationwide in the year 2021 only. The National Fire and Rescue Administration of the Ministry of Emergency Management released the latest data on Apr. 3, 2022 that in the first quarter of 2022, there were a total of 640 new energy vehicle fires, a year-on-year increase of 32%, that is, combustion accidents of 7 new energy vehicles each day on average.

In the Vehicle Electrification Academic Exchange Forum of the Beijing Institute of Technology held in July 2021, the laboratory in the Beijing Institute of Technology had categorized the states of the new energy vehicles that caught fire at that time. Vehicles that caught fire in a stationary state account for 38.5%, and vehicles that caught fire in a charging state account for 27.5%.

Therefore, how to ensure the safety of a battery box is the key to the healthy and successful promotion of the new energy industry in the future. Spontaneous combustion accidents during parking have soared. Due to the lack of means of protection, during parking of a vehicle, especially during parking and charging of the vehicle, the risk grows exponentially. In addition, in some specific environments, for example, an underground parking lot, a small-scale parking lot, or a charging site, fire control resources cannot be smoothly deployed and released, and public safety and property safety are susceptible to huge potential hazards.

In recent years, in fire control of a parking space in a few of parking lots, firewater spraying starts to be used to perform fire extinguishing, as in, for example, CN216092001U entitled "Fire Extinguishing Apparatus for Parking Space of New Energy Vehicle", CN216169473U entitled "Fire Control Isolation System for Underground Parking Space", CN113289283A entitled "Fire Prevention and Fire Extinguishing Apparatus and Method for Parking Space of Parking Garage", and CN114432616A entitled "Fire Detection and Isolation System and Method for Vehicle Parking Space", and the like. However, such external spraying is rather ineffective in fire extinguishing of electric vehicles. Fire of an electric vehicle is largely related to charging and discharging of a power battery. Restricted by materials of a vehicle body of the electric vehicle, external spraying can hardly put out fire inside the battery. As a result, once the electric vehicle catches fire, external fire extinguishing basically starts after the entire vehicle is on fire.

SUMMARY

An objective of the present application is to overcome deficiencies in the prior art, and provide an automatic fire extinguishing system for an electric vehicle parking space, to resolve existing "afterward fire extinguishing" in the technical status in the BACKGROUND. The present application provides an automatic fire extinguishing system related to an electric vehicle parking space. A detection system monitors a power battery pack inside an electric vehicle, and a fire control access system is used in combination to implement feeding of a fire extinguishing medium or an inert gas inside the electric vehicle, to implement targeted prevention and control and targeted fire extinguishing. In addition, an external thermal runaway isolation system is further used in combination to implement external fire extinguishing and isolated prevention and control for the electric vehicle.

The objective of the present application is achieved through the following technical measure: An automatic fire extinguishing system for an electric vehicle parking space includes a thermal runaway isolation system. The thermal runaway isolation system isolates a single corresponding parking space. The system further includes a detection system, a medium system, and a fire control access system. The detection system is installed inside a battery pack of an electric vehicle and performs fire monitoring inside the battery pack. One end of the fire control access system extends into a vehicle body of the electric vehicle and is joined to the inside of the battery pack, and the other end of the fire control access system extends out of the vehicle body of the electric vehicle and is communication with the medium system. The medium system is disposed outside an electric vehicle parking space.

Further, the fire control access system includes a transfer pipe and a quick insertion joint mechanism, the quick insertion joint mechanism is disposed on the transfer pipe, and it is implemented through connection and disconnection of the quick insertion joint mechanism that the battery pack of the electric vehicle is quickly joined to the medium system when a vehicle is parked on the parking space, and the battery pack of the electric vehicle is quickly disconnected from the medium system when the vehicle parked on the parking space is leaving.

Further, the fire control access system further includes a control unit, a one-way valve, and a nozzle, the nozzle is disposed inside the vehicle body of the electric vehicle, the nozzle is installed at an end of the transfer pipe and is directly joined to the battery pack, the one-way valve is disposed near the quick insertion joint mechanism, the one-way valve controls one-way passage of the transfer pipe, and the control unit controls medium feeding of the medium system into the transfer pipe.

Further, the detection system includes a detector and a detection battery, the detection battery supplying power to the detector is built in the detector, and the detector is electrically connected to the control unit.

Further, the medium system includes a fire extinguishing medium apparatus and an inert gas apparatus, an end of the transfer pipe is communication with the fire extinguishing medium apparatus and the inert gas apparatus, and a fire extinguishing medium or an inert gas is selected through the control unit to be introduced into the transfer pipe.

Further, a wireless communication module is built in each of the detection system and the control unit, data transmission and control are implemented between the detection system and the control unit through the wireless communication module, a data concentrator is integrated in the control unit, and the data concentrator is responsible for processing data and controlling connection and disconnection.

Further, the quick insertion joint mechanism includes a quick joint A and a quick joint B, an installation cavity A is opened in the quick joint A, a first valve core is disposed in the installation cavity A, one end of the first valve core extends out of the installation cavity A, a first spring is sleeved over the other end of the first valve core, the first valve core and the first spring are used for implementing opening and closing of the quick joint A, an installation cavity B is opened in the quick joint A, a second valve core is disposed in the installation cavity B, one end of the second valve core extends out of the installation cavity B, a second spring is sleeved over the other end of the second valve core, the second valve core and the second spring are used for implementing opening and closing of the quick joint B, when the quick joint A is connected to the quick joint B, the quick joint A and the quick joint B are both in an open state, and the quick joint A is communication with the quick joint B.

Further, a connection cavity is provided at an end of the quick joint B away from the second spring, and when the quick joint B is connected to the quick joint A, an end of the quick joint A away from the first spring is inserted into the connection cavity.

Further, a telescopic sleeve is sleeved over a circumferential outer side of the connection cavity, the telescopic sleeve is slidably connected to the circumferential outer side of the connection cavity, a reset spring is disposed between the telescopic sleeve and the connection cavity, the reset spring assists the telescopic sleeve in sliding and resetting, a through hole is opened in a sidewall of the connection cavity, a rolling ball is installed in the through hole, the through hole is disposed in a slide travel range of the telescopic sleeve, when the telescopic sleeve slides to compress the reset spring, the rolling ball is exposed, and when the telescopic sleeve slides to be reset, the rolling ball is covered.

Further, the first valve core includes a first tip, a first sealing plate, and a first guide pin, the first sealing plate and the first guide pin are disposed in the installation cavity A, a cross-sectional area of the first sealing plate adapts to a cross-sectional area of the installation cavity A, one side of the first sealing plate is connected to the first tip, the other side of the first sealing plate is connected to the first guide pin, the first tip extends out of the installation cavity A, and the first spring is sleeved over the first guide pin; and the second valve core includes a second tip, a second sealing plate, and a second guide pin, the second spring is sleeved over the second guide pin, the second sealing plate and the second guide pin are disposed in the installation cavity B, a cross-sectional area of the second sealing plate adapts to a cross-sectional area of the installation cavity B, one side of the second sealing plate is connected to the second tip, the other side of the second sealing plate is connected to the second guide pin, the second tip extends out of the installation cavity B, the first tip and the second tip are used in combination, the first tip retracts in the installation cavity A, and the second tip retracts in the installation cavity B.

Further, the transfer pipe includes an in-vehicle pipe and an external pipe, the in-vehicle pipe is disposed inside the vehicle body of the electric vehicle, and is responsible for communicating the battery pack and the quick insertion joint mechanism, and the external pipe is disposed outside the vehicle body of the electric vehicle, and is responsible for communicating the quick insertion joint mechanism and the medium system.

Further, the thermal runaway isolation system includes a fire control pipeline and a plurality of spray heads, the fire control pipeline is disposed at a top of the single parking space, and the plurality of spray heads are evenly distributed on the fire control pipeline.

Compared with the prior art, the beneficial effect is as follows: A detection system monitors a power battery pack inside an electric vehicle, and a fire control access system is used in combination to implement feeding of a fire extinguishing medium or an inert gas inside the electric vehicle, to implement targeted prevention and control and targeted fire extinguishing. In addition, an external thermal runaway isolation system is further used in combination to implement external fire extinguishing and isolated prevention and control for the electric vehicle. A quick insertion joint mechanism in the fire control access system is used to quickly and detachably join an external medium system to an internal battery pack. Therefore, thermal runaway prevention and control during parking of a vehicle and immediate internal targeted fire extinguishing in a case of fire are turned on for the electric vehicle. For wireless data transmission and control between the detection system and a control unit, compared with wired connections, costs of wiring harness connections, connection workload, and manual connection errors are reduced, so that an on-site environment is simple. A series of problems like cable aging in wired connections are effectively avoided.

The present application is described below in detail with reference to the accompanying drawings and specific implementations

Where: 1, battery pack, 2, nozzle, 3, in-vehicle pipe, 4, quick joint A, 5, quick joint B, 6, external pipe, 7, fire extinguishing medium apparatus, 8, first tip, 9, first sealing plate, 10, first guide pin, 11, first spring, 12, second tip, 13, second sealing plate, 14, second guide pin, 15, second spring, 16, telescopic sleeve, 17, reset spring, 18, rolling ball, 19, inert gas apparatus, 20, installation cavity A, 21, installation cavity B, 22, one-way valve, and 23, control unit

DETAILED DESCRIPTION OF THE EMBODIMENTS

Figure 1:
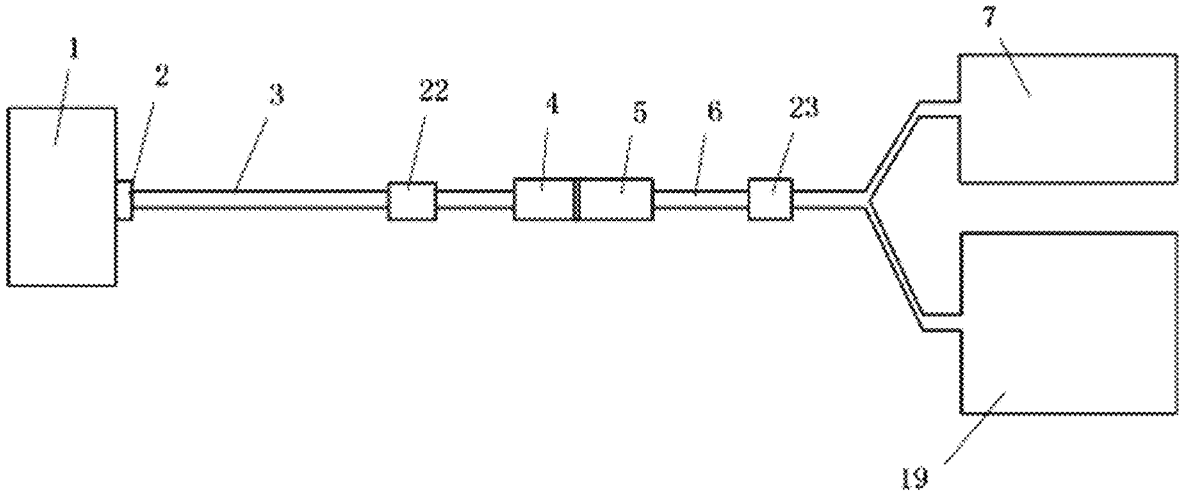
FIG. 1 is a schematic structural diagram according to the present application.
Figure 2:
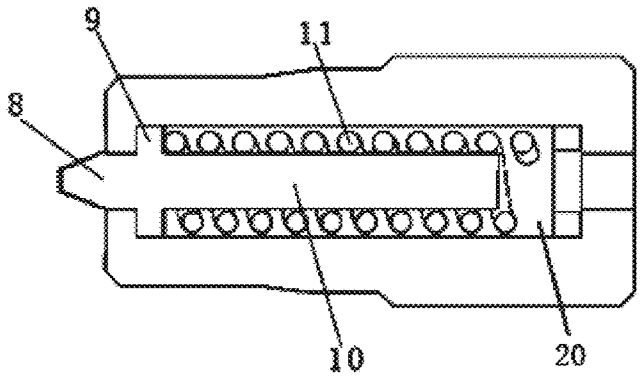
FIG. 2 is a schematic structural diagram of a quick joint A.
Figure 3:
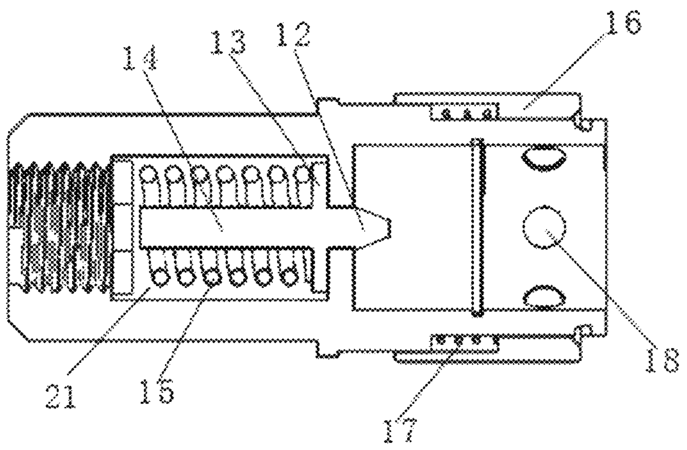
FIG. 3 is a schematic structural diagram of a quick joint B.

As shown in FIG. 1 to FIG. 3, the present application discloses an automatic fire extinguishing system for an electric vehicle parking space. The thermal runaway isolation system isolates a single corresponding parking space. The automatic fire extinguishing system includes a thermal runaway isolation system, and further including a detection system, a medium system, and a fire control access system. The detection system is installed inside a battery pack 1 of an electric vehicle and performs fire monitoring inside the battery pack 1. One end of the fire control access system extends into a vehicle body of the electric vehicle and is joined to the inside of the battery pack 1, and the other end of the fire control access system extends out of the vehicle body of the electric vehicle and is communication with the medium system. The medium system is disposed outside an electric vehicle parking space. The fire control access system includes a transfer pipe and a quick insertion joint mechanism. The quick insertion joint mechanism is disposed on the transfer pipe. It is implemented through connection and disconnection of the quick insertion joint mechanism that the battery pack 1 of the electric vehicle is quickly joined to the medium system when a vehicle is parked on the parking space, and the battery pack 1 of the electric vehicle is quickly disconnected from the medium system when the vehicle parked on the parking space is leaving. Electric vehicles consume no gasoline and are environmentally friendly. For this characteristic, electric vehicles have received strong support and promotion from the government and have entered consumers' shopping lists in recent years. Electric vehicles require charging to obtain power. During parking and charging, the battery pack 1 is usually easily prone to a thermal runaway and then fire due to high temperature generated from charging and discharging, especially when an external air temperature is also very high. An external housing of the battery pack 1 has a sealing requirement. Therefore, it is very difficult to implement targeted fire extinguishing inside the battery pack 1 on an actual electric vehicle. This is also the reason why fire prevention techniques developed by a person skilled in the art in recent years focus on external spraying and parking space isolation. In addition to exploring techniques of external spraying and parking space isolation, the present application innovatively provides techniques of targeted monitoring, targeted thermal runaway prevention and control, and targeted introduction of a fire extinguishing medium for fire extinguishing for the battery pack 1 inside the electric vehicle, to effectively extinguish a fire that starts from inside.

Further, the fire control access system further includes a control unit 23, a one-way valve 222, and a nozzle 2. The nozzle is disposed inside the vehicle body of the electric vehicle. The nozzle 2 is installed at an end of the transfer pipe and is directly joined to the battery pack 1. The one-way valve 22 is disposed near the quick insertion joint mechanism. The one-way valve 22 controls one-way passage of the transfer pipe. The control unit 23 controls medium feeding of the medium system into the transfer pipe. The control unit 23 controls on or off of a fire extinguishing medium apparatus 7 or an inert gas apparatus 19 to supply a fire extinguishing medium or an inert gas to the transfer pipe. The fire control access system implements targeted prevention and control for the battery pack 1 inside the electric vehicle, making targeted fire extinguishing possible. The one-way valve 22 can ensure that the transfer pipe only allows a medium to enter, and the medium is only fed into the battery pack 1. This also contributes to the sealing of the housing of the battery pack 1. The nozzle 2 is connected to the housing of the battery pack 1 in a sealed manner. When the quick insertion joint mechanism is joined, an in-vehicle pipe 3 of the electric vehicle is joined to the external pipe 6 (located outside the vehicle body of the electric vehicle). In this case, the fire extinguishing medium or the inert gas in the medium system may enter the housing of the battery pack 1 along a path "the external pipe 6—the quick insertion joint mechanism—the one-way valve 22—the in-vehicle pipe 3—the nozzle 2".

The detection system includes a detector and a detection battery. The detection battery supplying power to the detector is built in the detector. The detector is electrically connected to the control unit 23. The detection system is powered by a battery of the detection system, and can monitor the inside of the battery pack 1 uninterruptedly. Detection factors of the detector include CO, VOC, H2, pressure, temperature, and the like. The detection system comprehensively determines whether there is a risk of a thermal runaway or whether a thermal runaway has already occurred in the battery pack 1 inside the electric vehicle, and uploads a determining signal to the control unit 23 to perform an action (the control unit 23 controls the fire extinguishing medium or the inert gas to be introduced according to a case).

The medium system includes the fire extinguishing medium apparatus 7 and the inert gas apparatus 19. An end of the transfer pipe is communication with the fire extinguishing medium apparatus 237 and the inert gas apparatus 19. A fire extinguishing medium or an inert gas is selected through the control unit to be introduced into the transfer pipe. The fire extinguishing medium apparatus 7 may be an external firewater tank or a CO2 tank body, a perfluoro(2-methyl-3-pentanone) tank body, or the like. Certainly, external firewater may be a water port in a firewater system. The fire extinguishing medium apparatus 7 and the inert gas apparatus 19 are connected in parallel, one of which is selected through the control unit 23 for introduction into the transfer pipe. The inert gas apparatus 19 includes a N2 bottle and a pump set. The pump set provides power to N2 in the N2 bottle. During parking and charging, the introduction of N2 can effectively prevent thermal runaway of the battery pack 1.

The quick insertion joint mechanism includes a quick joint A 4 and a quick joint B 5. An installation cavity A 20 is opened in the quick joint A 4. A first valve core is disposed in the installation cavity A 20. One end of the first valve core extends out of the installation cavity A 20, and a first spring 11 is sleeved over the other end of the first valve core. The first valve core and the first spring 11 are used for implementing opening and closing of the quick joint A 4. An installation cavity B 21 is opened in the quick joint A 4. A second valve core is disposed in the installation cavity B 21. One end of the second valve core extends out of the installation cavity B 21, and a second spring 15 is sleeved over the other end of the second valve core. The second valve core and the second spring 15 are used for implementing opening and closing of the quick joint B 5. When the quick joint A 4 is connected to the quick joint B 5. The quick joint A 4 and the quick joint B 5 are both in an open state. The quick joint A 4 is communication with the quick joint B 5. The quick joint A 4 is disposed on the vehicle body of the electric vehicle and is communication with the in-vehicle pipe 3. The quick joint B 5 is disposed on an external pipeline. When a vehicle is parked, the quick joint A 4 is butt-joined to the quick joint B 5 to implement communication between the external pipeline and the in-vehicle pipe 3. When the parked vehicle needs to leave, the quick joint B 5 is unplugged, and the quick joint A 4 moves with the electric vehicle together.

A connection cavity is provided at an end of the quick joint B 5 away from the second spring 15. When the quick joint B 5 is connected to the quick joint A 4, an end of the quick joint A 4 away from the first spring 11 is inserted into the connection cavity.

A telescopic sleeve 16 is sleeved over a circumferential outer side of the connection cavity. The telescopic sleeve 16 is slidably connected to the circumferential outer side of the connection cavity. A reset spring 17 is disposed between the telescopic sleeve 16 and the connection cavity. The reset spring 17 assists the telescopic sleeve 16 in sliding and resetting. A through hole is opened in a sidewall of the connection cavity. A rolling ball 18 is installed in the through hole, the through hole is disposed in a slide travel range of the telescopic sleeve 16. When the telescopic sleeve 16 slides to compress the reset spring 17, the rolling ball 18 is exposed. When the telescopic sleeve 16 slides to be reset, the rolling ball 18 is covered.

Further, the first valve core includes a first tip 8, a first sealing plate 9, and a first guide pin 10. The first sealing plate 9 and the first guide pin 10 are disposed in the installation cavity A 20. A cross-sectional area of the first sealing plate 9 adapts to a cross-sectional area of the installation cavity A 20. One side of the first sealing plate 9 is connected to the first tip 8, and the other side of the first sealing plate 9 is connected to the first guide pin 10. The first tip 8 extends out of the installation cavity A 20. The first spring 11 is sleeved over the first guide pin 10. The second valve core includes a second tip 12, a second sealing plate 13, and a second guide pin 14. The second spring 15 is sleeved over the second guide pin 14. The second sealing plate 13 and the second guide pin 14 are disposed in the installation cavity B 21. A cross-sectional area of the second sealing plate 13 adapts to a cross-sectional area of the installation cavity B 21. One side of the second sealing plate 13 is connected to the second tip 12, and the other side of the second sealing plate 13 is connected to the second guide pin 14. The second tip 12 extends out of the installation cavity B 21. The first tip 8 and the second tip 12 are used in combination. The first tip 8 retracts in the installation cavity A 20. The second tip 12 retracts in the installation cavity B 21.

The quick joint A 4 is inserted into the connection cavity of the quick joint B 5. The telescopic sleeve 16 slides to expose the rolling ball 18. The quick joint A 4 continues to be inserted. An outer circumference of the quick joint A 4 pushes the rolling ball 18 outward, and the telescopic sleeve 16 slides in the opposite direction to press the rolling ball 18. In this way, insertion and locking of the quick joint A 4 and the quick joint B 5 are implemented. The first tip 8 and the second tip 12 are in contact inside, and are pushed against each other. In the installation cavity A 20, the first tip 8 is subjected to a force to compress the first spring 11 in the opposite direction. In the installation cavity B 21, the second tip 12 is subjected to a force to compress the second spring 15 in the opposite direction. Both the first tip 8 and the second tip 12 are diameter-variable ends, and therefore when the tips are pushed against each other, a gap is exposed between the installation cavity A 20 and the first tip 8, and a gap is exposed between the installation cavity B 21 and the second tip 12. The two gaps directly put through a flow channel between the installation cavity A 20 and the installation cavity B 21. Normally, the first sealing plate 9 closes an exit of the installation cavity A 20, and the second sealing plate 13 closes an exit of the installation cavity B 21.

The transfer pipe includes an in-vehicle pipe 3 and an external pipe 36. The in-vehicle pipe is disposed inside the vehicle body of the electric vehicle, and is responsible for communicating the battery pack 1 and the quick insertion joint mechanism. The external pipe 6 is disposed outside the vehicle body of the electric vehicle, responsible for communicating the quick insertion joint mechanism and the medium system.

The thermal runaway isolation system includes a fire control pipeline and a plurality of spray heads. The fire control pipeline is disposed at a top of the single parking space. The plurality of spray heads are evenly distributed on the fire control pipeline. An existing technology may be used for the thermal runaway isolation system.

A wireless communication module is built in each of the detection system and the control unit. Data transmission and control are implemented between the detection system and the control unit through the wireless communication module. A data concentrator is integrated in the control unit. The data concentrator is responsible for processing data and controlling connection and disconnection. Specifically, the wireless communication module has a wireless sending and receiving function, establishes a connection through an internal protocol and an internal ad hoc network manner, implements data exchange, and completes functions of thermal runaway detection and control. The detector in the detection system sends out data detected by the wireless communication module, and the control unit receives, through the wireless communication module, the data transmitted by the detector. The data concentrator processes data transferred by the detector, and selectively controls, according to a data processing result, N2 or a fire extinguishing medium to be introduced into the battery pack. Specifically, a wireless transceiver hardware circuit is disposed in the detector, and a wireless transceiver hardware circuit is disposed in the control unit. The detector and the control unit perform data communication through a wireless network. A 802.15.4 system chip with ultra-low power consumption is used as a main chip in the wireless network, and a 6LowPan protocol stack is used. On the premise that low power consumption is met, a provided wireless connection has a better penetration capability and a longer transmission distance. A wireless standard of the 802.15.4 system chip provides a PHY with low power consumption and a low data rate in a plurality of unlicensed bands. The wireless standard of the 802.15.4 system chip defines a reliability and acknowledged data packet-based MAC layer, and has an optional encryption and verification function. The 6LowPan protocol stack has a 802.15.4 2.4-GHz PHY and a 802.15.4-based link layer, and adds synchronization, channel frequency modulation, priority, and time-based verification to the MAC layer of the wireless standard of the 802.15.4 system chip. The 6LowPan protocol stack has a network layer that provides a path and end-to-end security and an unreliable/reliable grid transport layer. Slot timing, a method for keeping synchronization of devices, and a slot-type channel frequency modulation characteristic are specified in the 6LowPan protocol stack. The wireless standard of the 802.15.4 system chip is used to overcome technical barriers in current wireless communication. The effect of the 6LowPan protocol is to implement seamless integration of wireless communication and a wired device. A wireless network built based on the protocol is a highly reliable network. Even if devices are spaced apart by tens to hundreds of meters, each device has a plurality of adjacent devices to which the device can send data, to provide a line hierarchy required to achieve high reliability. There is unreliability in wireless communication in a current new energy vehicle environment. A sent data packet is blocked from reaching a receiver in many cases. If two independent transmitters transfer data in a same channel, the transmitters may damage signals of each other in a wireless circuit of the receiver. In this case, the transmitter need to retransmit the signals, leading to increases in time and energy consumption. The wireless communication technology in this application can adequately resolve the low reliability problem in current wireless communication. The detector is responsible for acquiring and reporting current environmental state information, and notifies the information to the control unit that becomes a network manager. Furthermore, the wireless transceiver hardware circuit is the wireless communication module, and includes a wireless integrated chip, a power supply chip, a hardware encryption chip, and an antenna. The wireless transceiver hardware circuit is a connecting bridge between the wireless network and a detection control system. The wireless transceiver hardware circuit is responsible for running an access point radio function and a network management algorithm, to ensure the reliability of network performance. The wireless network uses time synchronization to enable channel frequency modulation and adjust a duty cycle of radio communication. The hardware encryption chip keeps the overall communication from being cracked by a foreign party. The power supply chip is configured to supply power in the wireless transceiver hardware circuit. If a wireless node suddenly shuts down (is faulty), a neighbor of the wireless node reports a path alarm after a period of time. The path alarm enables the network manager to reattempt to communicate with the wireless node. If communication fails for a period of time, the network manager discards the faulty wireless node, and rematches a new wireless node path. The main chip has strong keys and key management, whitelist settings, password quality random number generation, and message integrity check, and a hardware encryption chip or another manner is combined to encrypt all transmitted data, thereby greatly improving the security of the system.

In the description of the present application, it needs to be understood that orientation or location relationships indicated by terms "up", "middle", "outside", and "inside" are only used to facilitate description of the present application and simplify description, but are not used to indicate or imply that the components or elements must have specific orientations or are constructed and operated by using specific orientations, and therefore, cannot be understood as a limit to the present application.

For a person skilled in the art, apparently, the present application is not limited to the details in the foregoing exemplary embodiments, and the present application can be implemented in other specific forms without departing from the spirit or basic features of the present application. Therefore, from all perspectives, the embodiments should be considered to be exemplary and non-limitative. The scope of the present application is defined by the appended claims instead of the foregoing description. Therefore, all changes that fall within the meanings and scope of equivalent elements of the claims are intended to be covered by the present application. Any reference numeral in the claims should not be construed as limiting the related claims.

In addition, it should be understood that although the specification is described according to the implementations, each implementation does not necessarily include only one independent technical solution. The description manner of the specification is only used for clarity, and a person skilled in the art should consider the specification as a whole. The technical solutions in the embodiments may be appropriately combined to form other implementations comprehensible to a person skilled in the art.

The invention claimed is:

1. An automatic fire extinguishing system for a parking space of an electric vehicle, the automatic fire extinguishing system comprising:

a thermal runaway isolation system, configured to isolate the parking space;

a detection system, installed inside a battery pack of the electric vehicle and configured to perform fire monitoring inside the battery pack;

a medium system, disposed outside the parking space; and a fire control access system, wherein one end of the fire control access system extends into a vehicle body of the electric vehicle and is joined to an inside of the battery pack, wherein another end of the fire control access system extends out of the vehicle body of the electric vehicle and is connected to the medium system;

wherein the fire control access system comprises a transfer pipe and a quick insertion joint mechanism disposed on the transfer pipe, the quick insertion joint mechanism being configured for connection and disconnection between the battery pack of the electric vehicle and the medium system; wherein the battery pack of the electric vehicle is joined to the medium system when the electric vehicle is parked on the parking space, and is disconnected from the medium system when the vehicle parked in the parking space is leaving;

wherein the quick insertion joint mechanism comprises a quick joint A and a quick joint B, an installation cavity A is defined in the quick joint A, a first valve core is disposed in the installation cavity A, one end of the first valve core extends out of the installation cavity A, a first spring is sleeved over another end of the first valve core, the first valve core and the first spring are configured for implementing opening and closing of the quick joint A; wherein an installation cavity B is opened in the quick joint B, a second valve core is disposed in the installation cavity B, one end of the second valve core extends out of the installation cavity B, a second spring is sleeved over another end of the second valve core, the second valve core and the second spring are used for implementing opening and closing of the quick joint B, when the quick joint A is connected to the quick joint B, the quick joint A and the quick joint B are both in an open state, and the quick joint A is communicated with the quick joint B;

wherein the first valve core comprises a first tip extending out of the installation cavity A, and the second valve core comprises a second tip extending out of the installation cavity B; and wherein when the quick joint A is connected to the quick joint B, the first tip and the second tip are in contact and push against each other thus causing the first tip to retract into the installation cavity A and compress the first spring, and causing the second tip to retract into the installation cavity B and compress the second spring, such that the quick joint A and the quick joint B are both in an open state, and the quick joint A is communicated with the quick joint B.

2. The automatic fire extinguishing system for an electric vehicle parking space according to claim 1, wherein the fire control access system further comprises a control unit, a one-way valve, and a nozzle, wherein the nozzle is disposed inside the vehicle body of the electric vehicle, the nozzle is installed at an end of the transfer pipe and is directly joined to the battery pack, the one-way valve is disposed near the quick insertion joint mechanism, the one-way valve controls a one-way passage of the transfer pipe, and the control unit is configured to control a medium feeding of the medium system into the transfer pipe.

3. The automatic fire extinguishing system for an electric vehicle parking space according to claim 2, wherein the detection system comprises a detector and a detection battery, the detection battery is configured to supply power for the detector and is built in the detector, and the detector is electrically connected to the control unit.

4. The automatic fire extinguishing system of claim 3, wherein the detector is configured to detect at least one selected from the group consisting of CO, VOC, H2, pressure, and temperature.

5. The automatic fire extinguishing system for an electric vehicle parking space according to claim 2, wherein the medium system comprises a fire extinguishing medium apparatus and an inert gas apparatus, wherein one end of the transfer pipe is communicated with the fire extinguishing medium apparatus and wherein another end of the transfer pipe is communicated with the inert gas apparatus, and wherein the control unit is configured to select a fire extinguishing medium or an inert gas to be introduced into the transfer pipe;

wherein the control unit is configured to:

(i) Introduce the inert gas into the transfer pipe to prevent thermal runaway in response to the detection system detecting a risk of thermal runaway without an actual fire; and (ii) introduce the fire extinguishing medium into the transfer pipe to extinguish a fire in response to the detection system detecting that a thermal runaway has already occurred.

6. The automatic fire extinguishing system of claim 5, wherein the fire extinguishing medium apparatus and the inert gas apparatus are connected in parallel to the transfer pipe.

7. The automatic fire extinguishing system for an electric vehicle parking space according to claim 2, wherein a wireless communication module is built in each of the detection system and the control unit, data transmission and control are implemented between the detection system and the control unit through the wireless communication module, a data concentrator is integrated in the control unit, and the data concentrator is configured for processing data and controlling connection and disconnection.

8. The automatic fire extinguishing system of claim 7, wherein the wireless communication module comprises a hardware encryption chip configured to encrypt data transmitted between the detection system and the control unit.

9. The automatic fire extinguishing system of claim 7, wherein the wireless communication module comprises an 802.15.4 system chip as a main chip and employs a 6LowPan protocol stack.

10. The automatic fire extinguishing system for an electric vehicle parking space according to claim 1, wherein a connection cavity is defined at an end of the quick joint B facing away from the second spring, and when the quick joint B is connected to the quick joint A, an end of the quick joint A away from the first spring is inserted into the connection cavity.

11. The automatic fire extinguishing system for an electric vehicle parking space according to claim 10, wherein a telescopic sleeve is sleeved over a circumferential outer side of the connection cavity, the telescopic sleeve is slidably connected to the circumferential outer side of the connection cavity, a reset spring is disposed between the telescopic sleeve and the connection cavity, the reset spring assists the telescopic sleeve in sliding and resetting, a through hole is opened in a sidewall of the connection cavity, a rolling ball is installed in the through hole, the through hole is disposed in a slide travel range of the telescopic sleeve, when the telescopic sleeve slides to compress the reset spring, the rolling ball is exposed, and when the telescopic sleeve slides to be reset, the rolling ball is covered.

12. The automatic fire extinguishing system for an electric vehicle parking space according to claim 1, wherein the first valve core further comprises a first sealing plate and a first guide pin, the first sealing plate and the first guide pin are disposed in the installation cavity A, a cross-sectional area of the first sealing plate adapts to a cross-sectional area of the installation cavity A, a side of the first sealing plate is connected to the first tip, another side of the first sealing plate is connected to the first guide pin, and the first spring is sleeved over the first guide pin; and wherein the second valve core further comprising a second sealing plate and a second guide pin, the second spring is sleeved over the second guide pin, the second sealing plate and the second guide pin are disposed in the installation cavity B, a cross-sectional area of the second sealing plate adapts to a cross-sectional area of the installation cavity B, a side of the second sealing plate is connected to the second tip, another side of the second sealing plate is connected to the second guide pin, the second tip extends out of the installation cavity B, the first tip and the second tip are used in combination, the first tip stretches out and draws back from the installation cavity A, and the second tip stretches out and draws back from the installation cavity B.

13. The automatic fire extinguishing system for an electric vehicle parking space according to claim 1, wherein the transfer pipe comprises an inner pipe and an external pipe, the inner pipe is disposed inside the vehicle body of the electric vehicle, and is responsible for communicating the battery pack and the quick insertion joint mechanism, and the external pipe is disposed outside the vehicle body of the electric vehicle, and is responsible for communicating the quick insertion joint mechanism and the medium system.

14. The automatic fire extinguishing system for an electric vehicle parking space according to claim 1, wherein the thermal runaway isolation system comprises a fire control pipeline and spray heads, the fire control pipeline is disposed at a top of the single parking space, and the spray heads are evenly distributed on the fire control pipeline.

* * * * *